United States Patent Office 3,503,260
Patented Mar. 31, 1970

3,503,260
PYROMETER CONSTRUCTION
Nathan H. Polsky, Levittown, N.Y., assignor to Electronic Development Laboratories, Inc., Plainview, N.Y.
Filed Apr. 1, 1968, Ser. No. 717,608
Int. Cl. G01k 7/12
U.S. Cl. 73—361                                4 Claims

ABSTRACT OF THE DISCLOSURE

Pyrometer construction in which the cold ends are disposed outwardly of the casing of the instrument adjacent a bulb thermometer, whereby the instrument may be calibrated thereagainst. Means are provided for completely electrically isolating the galvanometer during such calibration. The device is so constructed that when the same is exposed to a rapid change in temperature, the temperature of the cold end will vary at substantially the same rate of change as the bulb of the thermometer.

---

This invention relates generally to the field of pyrometry, and more particularly to an improved form thereof having provision for maintaining substantial accuracy upon the occurrence of a change in environmental temperature, without the necessity of waiting until the instrument has become stabilized with respect to the new environmental temperature.

In the art of thermocouple pyrometry of the direct meter reading types, many methods are employed for compensation against detrimental E.M.F. generated by the cold junction when exposed to ambient temperature changes. All of these methods are reasonably effective while the pyrometer is maintained in a particular ambient temperature or in an ambient temperature which rises or falls very slowly. However, should the pyrometer be moved from one ambient temperature to another of a substantial difference, such as 40 degrees F. or more, and an immediate measurement is attempted, a considerable uncontrolled cold junction E.M.F. is developed which causes an error in the actual temperature indication on the meter. This error effect occurs because the device which is used to compensate for the ambient cold junction error is located in an area where such factors as mass, and the ability of some components and the lack of ability of other components, make it impossible for all components comprising the cold junction compensation to act in unison and to the proper extent. Accordingly, in the present state of the art it has not been possible to produce thermocouple type direct meter reading pyrometers economically which are able to function accurately immediately upon being taken from one ambient temperature to another ambient temperature of such a substantial difference, for example, such as from 0 degrees F. to 70 degrees F., or from 120 degrees F. to 70 degrees F., and vice versa. This is especially evident in portable pyrometers having low temperature ranges such as 0 to 300 degrees F. Meter indication errors as large as 20° F. are common as a result of cold junction ambient errors. Substantial errors in these types of pyrometers also occur as a result of cold junction E.M.F. developed when these pyrometers are used in an extreme ambient temperature, such as 0 degrees F. or 120 degrees F., without a change in ambient temperature taking place.

The present invention contemplates an elimination of large cold junction errors from developing by removing the cold junction from the inside of the meter casing where it is difficult to control, and placing it outside the meter area where an effective control may readily be maintained. To establish this effective cold junction compensation, the cold junction operates in conjunction with a glass bulb thermometer where, owing to adjacent location, are affected by the surrounding free air rather than any masses or totally confined air within the meter casing. In doing so, the cold junction can be made to act in the same manner as the thermometer by arranging the mass or heat conductivity of each to be similar. To accomplish this end, the cold junction is covered with a ceramic substance which is basically similar to the mass and heat conductivity of the thermometer bulb. The cold junction assembly may be covered with glass, or any protective coating, or may remain uncovered. It is commonly known that thermometers of the same size and shape do not necessarily respond at the same time rate, as a result of the bulb mass and the capillary size. Therefore, any object designed to function with a glass bulb thermometer, if it is to operate at the same time rate, must also be capable of having its mass altered so that it can function at the same rate as the thermometer, or, if desired, the cold end may be placed directly on or closely adjacent to the thermometer bulb, thereby making both respond similarly with respect to temperature changes. In the embodiment described hereinafter the thermometer is placed in a heat-conductive tube which may be made in a variety of configurations to enable the thermometer to respond faster or slower to further track with the time response of the cold junction assembly.

It is therefore among the principal objects of the present invention to provide an improved pyrometer construction which may maintain a substantial accuracy over a wide range of operating temperatures, and be relatively insensitive to changes in ambient temperature to which the cold junction is exposed.

Another object of the invention lies in the provision of improved pyrometer construction, possessed of the above advantages, which may be used within an ambient temperature in which it has been placed, substantially immediately thereafter, and without the necessity of waiting until all of the component parts of the pyrometer have reached the ambient temperature.

Yet another object of the invention lies in the provision of improved pyrometer construction possessed of the above advantages, in which the cost of fabrication may be of a reasonably low order, far below that of existing prior art devices of similar accuracy, thereby permitting consequent wide sale, distribution and use.

In the drawing, to which reference will be made in the specification, similar reference characters have been employed to designate corresponding parts throughout the several views.

Figure 1:
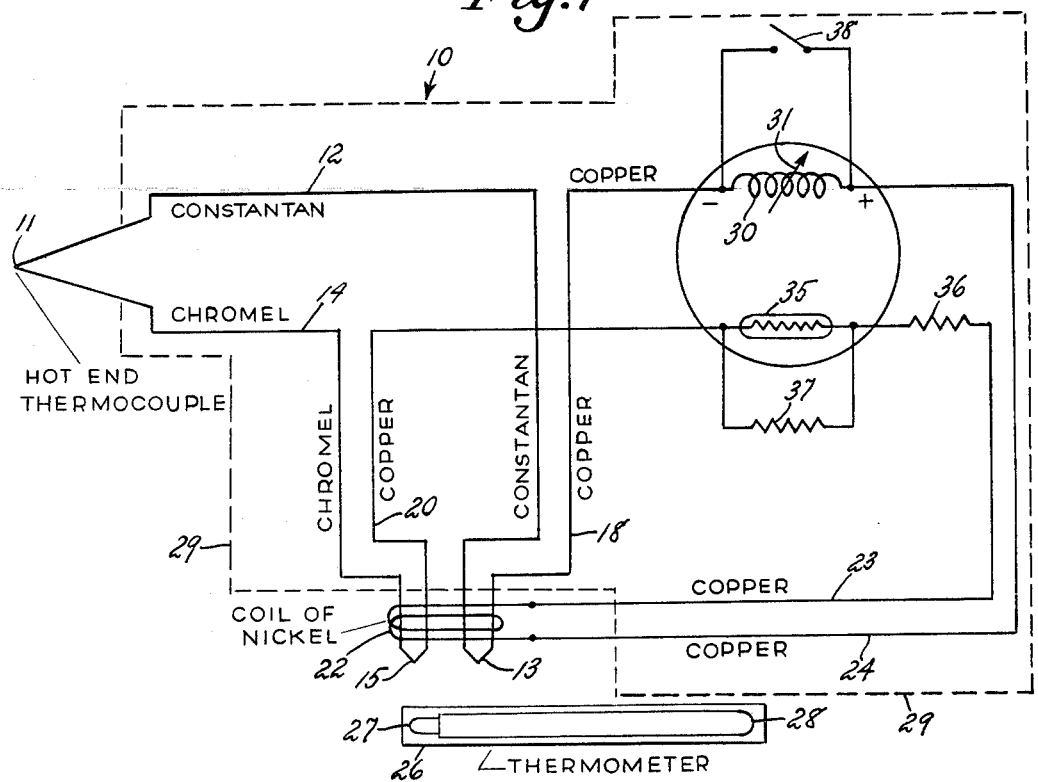
FIGURE 1 is a schematic wiring diagram showing an embodiment of the invention.

Before entering into a detailed consideration of the disclosed embodiment, a brief discussion of the present state of the art is considered apposite. It is a common practice in the prior art to place a thermometer on or near the meter proper or to employ a bi-metal temperature sensitive spiral attached to one of the meter movement springs, or to employ both as a method of correcting cold junction error. However, the thermometer or bi-metal spiral as used in the art is employed to indicate the ambient temperature of the instrument after temperature stabilization of all components has occurred. The thermometer or bi-metal or both does not function efficiently, and fails to properly compensate for the cold junction E.M.F. developed where rapid or large ambient temperature changes occur, thereby creating an error. The thermometer or bi-metal or both in such an application provides a reading of the temperature at the area of its location at a particular time. Thus, such a thermometer or bi-metal spiral is effective only when the instrument in which it is mounted has remained in a given temperature (within a narrow ambient temperature span) for a relatively long period of time which allows all components within the instrument casing comprising the pyrometer to attain substantially the same temperature as the thermometer or the bimetal spiral.

The present invention functions in accordance with an entirely different principle. Instead of the usual practice where only the thermocouple wires which enter the instrument casing by a connective means to form a cold junction when combined with the usual copper wiring, a pair of thermocouple cold junctions are located outside of the instrument proper and are arranged so that only copper wires are connected to copper and thermocouple wires of the same material (alloy) are connected to thermocouple wires respectively at the meter or inside the instrument casing. In this manner, uncontrolled cold junction E.M.F. voltages are eliminated from inside the instrument. At no time is copper wire connected to thermocouple wire within the instrument. Each cold junction consists of one of the thermocouple materials and a copper wire joined together by welding, soldering, twisting or brazing. Thus, the two thermocouple wires which by themselves would ordinarily be connected at the meter or instrument area to form a detrimental uncontrolled cold junction E.M.F. are located outside the instrument area as two separate cold junctions. These cold junctions are ideally located and can be controlled or monitored as needed. Each cold junction employs copper as one basic material of the cold junctions. It should be noted that when the most accurate measurements of temperatures by the use of thermocouples is attempted in the present state of the art, the thermocouple cold junction remains outside the instrument and is immersed in ice to maintain the cold junction at a precise reference temperature. This practice, obviously is not practical for use with general purpose pyrometers, of the portable type, and particularly where speed of temperature measurement is a requirement. The present invention enables accurate cold junction compensation to be employed in general purpose pyrometers, as well as portable, relatively inexpensive types, and under conditions where speed of temperature measurement is necessitated. In addition, the invention contemplates accuracies to a fraction of a degree where such close accuracy is required. The accuracy of the cold junction compensation is governed by the accuracy of the thermometer, and the provision of dual cold junction construction. By such structure, errors of less than 2 degrees F., may be obtained in mass produced pyrometers for use in the ambient temperature range of from 0 degrees F., to 120 degrees F., in pyrometers normally having a temperature scale range of 0 degrees to 300 degrees F. As noted above, this error can be substantally lessened by selection of thermometers, cold junction mass, positioning, and selection of thermometer tube housing. In general purpose pyrometers, as used in the present state of the art, cold junction errors as large as 30 degrees F. are introduced when subjected to a rapid change of ambient environment of 120 degrees F. in pyrometers of this type. The ambient error in pyrometers contemplated by the present invention is within one percent of full scale value for a range of 300 degrees F., and progressively decreases to one-half percent of full scale value for a scale range of 0 to 600 degrees F., etc. This construction also minimizes errors to a point where they are practically negligible where small changes in ambient temperatures are encountered in the order of 10 degrees F., regardless of whether the change is rapid or slow. In such instances, the error introduced is resolved to the error of the thermometer alone.

With the foregoing in mind, reference is made to the drawing, in which, in accordance with the disclosed embodiment, the device, generally indicated by reference character 10, includes a thermocouple 11, most conveniently formed as a probe, as is well known in the art. A first conductor 12 leads to a first cold junction 13, while a second conductor 14 leads to a second cold junction 15. In line with established practice, the first conductor 12 is one of constantan alloy, and the second conductor 14 of Chromel.

Figure 2:
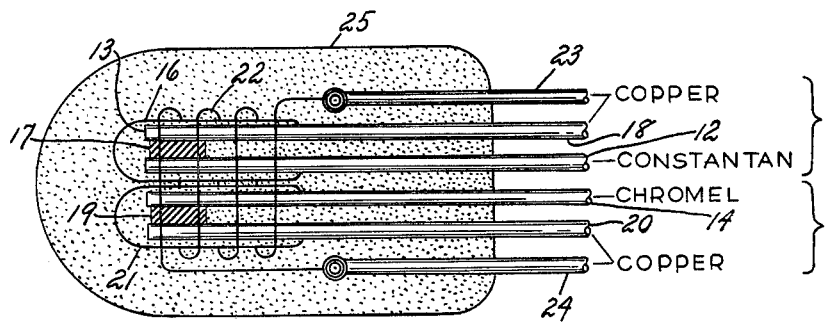
FIGURE 2 is a fragmentary enlarged schematic sectional view showing the construction of the cold junction thereof.

Referring to FIGURE 2 in the drawing, the first cold junction 13 is formed by silver soldering at 17 the conductor 12 of constantan to a copper wire 18. Similarly, the conductor 14 of Chromel is silver soldered to a copper conductor 20. Each oft he junctions is then coated with ceramic cement to form envelopes as indicated by reference characters 16 and 21, following which the junctions are placed in abutted relation and wound with a nickel wire coil 22, having copper leads 23 and 24 attached thereto, following which the junctions are enclosed in a larger ceramic envelope 25.

During assembly of the device, the envelope 25 is positioned outwardly of the instrument casing 29, and adjacent a thermometer casing 26 of aluminum or other heat conductive metal, or plastic covering the entire thermometer, but providing an opening to view the thermometer 28.

The copper wire 18 leads to glavanometer coil 30 which includes mechanical adjusting means 31 of well-known type, the opposite end of the coil being connected to the coil 22.

The wire 20 is connected to a negative coefficient thermistor 35, of well known type for compensating for the positive coefficient of the copper in the armature of the galvanometer. The thermistor is connected in series with a calibration resistor 36, and in parallel with a Manganin resistor 37, which limits the controlling effect of the thermistor 35, following which the above circuit is connected in series with the nickel wire coil 22. The armature coil may be shorted out from the remaining portions of the circuit by switch 38.

From a consideration of the above described structure, the function of the device will be apparent. Essentially, two cold junctions, are provided each junction consisting of one thermocouple alloy joined to one copper wire. It will be understood by those skilled in the art that in the type of pyrometer which employs one alloy against copper as the hot junction thermocouple, one cold junction is sufficient. The cold junctions develop an E.M.F. opposite to the hot junction of the same thermocouple. The E.M.F. of each cold junction is additive, and they are arranged in the circuit so that they are in series with but in reverse polarity to the hot junction thermocouple. Thus, when the cold junctions and the hot junctions of the same thermocouple are exposed to one temperature, equal and opposite E.M.F. polarities are established and create a null condition which is void of any E.M.F. output. When the cold junctions and the hot junction thermocouple are subjected to different temperatures, an E.M.F. is developed and will be exhibited by an indication on the meter.

To compensate for any resistance changes which may occur due to copper armature temperature coefficient not completely compensated by the negative coefficient thermistor, a device (the nickel coil 22) having a positive or negative resistance coefficient is placed on, or near the cold junctions. This coefficient device can also serve where required to compensate for the speed of response of the thermometer. Thus, an additional means is provided for obtaining an extremely close relationship between the thermometer response time and the cold junction response time. Since pyrometers are, by nature, sensitive to resistance changes, as well as the E.M.F. developed by the thermocouple, the temperature coefficient device can be selected to change its resistance in a positive or negative direction as required and thus can effectively cancel out any desired amount of copper coefficient error from appearing in the ambient temperature span of the instrument. The positive and negative coefficient devices are well known to the art, such as thermistors, nickel, copper, plus other elements, oxides, and alloys.

A thermometer is placed near, adjacent to or in direct contact with the cold junctions in order to assure exposure to the same ambient temperature and to function in unison therewith. The thermometer is employed as a visual reference in degrees to observe the corresponding E.M.F. developed by the two cold ends resulting from the ambient temperature to which they are exposed.

Regardless of whether the ambient temperature changes rapidly, slowly, or remains constant, the thermometer and the cold junctions will respond at the same rate with respect to time. Thus, the use of a thermometer in conjunction with the thermocouple cold junctions produce an E.M.F. that is synonymous with and is translatable into degrees of temperature, thereby providing a means for observing the cold junction ambient temperature E.M.F. in terms of degrees. Since this cold junction ambient temperature E.M.F. corresponds to a specific temperature in degrees, it is transposable to a meter reading which is calibrated in degrees; thereby providing a means where an accurate ambient compensation can be made by simply transferring the ambient thermometer temperature reading to the meter. This is accomplished by setting the meter indicating pointer to indicate the same ambient temperature as indicated by the thermometer at any given time, thereby resulting in a minimal or acceptable negligible ambient temperature error. This method of compensation for cold junction errors due to ambient temperature or ambient temperature changes is not automatic. It is controlled by the user. The adjusting means 31 is coupled to one of the meter springs so that by moving or rotating the adjustment means the meter pointer will respond to such movement. The range of the adjustment means must be such that the meter pointer can traverse a meter scale temperature span equal to or more than the ambient temperature span to which the instrument will be exposed. Such a pointer adjustment means is well known in the meter construction art.

The method of operating a pyrometer with the disclosed ambient compensation system is simple. The meter shorting switch 38, is used to prevent any E.M.F. produced by either the cold junctions or the thermocouple hot junction from being applied to the meter, during adjustment, and thus the indicating pointer is not influenced by any E.M.F. from either the cold junctions or the hot junction and the pointer remains at rest. While in this state, when no E.M.F. is being applied to the meter, the pointer adjustment means is rotated or moved to the position which will set the meter pointer to the same ambient temperature value on the meter scale as is indicated on the thermometer which is indicating the ambient temperature. The meter shorting switch may then be disengaged, and only the temperature sensed by the thermocouple hot junction is indicated on the meter. The visual temperature reading as sensed by the hot junction thermocouple is devoid of cold terminal error (ambient error) by virtue of having been eliminated through an actual visual reference which has been corrected for by the meter being set to the true ambient temperature as indicated by the thermometer. It would be apparent that the thermometer reading, as used in this disclosure, is not the same thermometer reading as presently used in the art, but a thermometer means for translating the cold junction E.M.F. into terms of temperature to provide an actual visual meter reading means of compensation for the true cold junction E.M.F.

I wish it to be understood that I do not consider the invention limited to the precise details of structure shown and set forth in this specification, for obvious modifications will occur to those skilled in the art to which the invention pertains.

I claim:

1. Thermocouple pyrometer construction comprising: a hot junction thermocouple, a cold thermocouple junction connected in series with said hot junction, galvanometer means in series with said thermocouples for indicating voltages developed upon the occurrence of temperature differentiation therebetween, thermometer means in proximity with said cold junction, means associated with said thermometer and said cold junction for causing each to change temperature in a given ambient temperature at substantially the same rate of change of temperature, and means for manually indexing said galvanometer in accordance with the indicated temperature on said thermometer; and temperature coefficient correcting means connected in series with said galvanometer and said cold junction, said last mentioned means including a coil of wire looped about said cold junction.

2. Structure in accordance with claim 1, said cold junction being enclosed in an electrically insulative material.

3. Structure in accordance with claim 1, said cold junction being enclosed in a ceramic element.

4. Structure in accordance with claim 1, including a pair of cold junctions interconnected in series, one of which is formed of constantan and copper, and the other of Chromel and copper.

References Cited

UNITED STATES PATENTS

| 2,475,238 | 5/1949 | Hall | 73—361 |
| 2,769,340 | 11/1956 | Bernreuter | 73—361 |

FOREIGN PATENTS

| 849,018 | 9/1952 | Germany. |
| 1,009,045 | 2/1952 | France. |

LOUIS R. PRINCE, Primary Examiner

DENIS E. CORR, Assistant Examiner